United States Patent
Cooke

[15] 3,674,110
[45] July 4, 1972

[54] WOUND FILAMENT LADDER
[72] Inventor: Robert F. Cooke, Candia, N.H.
[73] Assignee: Unitec Industries, Inc., Cockeysville, Md.
[22] Filed: June 1, 1970
[21] Appl. No.: 41,895

[52] U.S. Cl. ............................................182/46, 182/219
[51] Int. Cl. ........................................................E06c 7/08
[58] Field of Search .................... 182/46, 194, 228, 219

[56] References Cited

UNITED STATES PATENTS

| | | | |
|---|---|---|---|
| 3,318,413 | 5/1967 | Werner et al. | 182/46 |
| 3,009,532 | 11/1961 | Richard | 182/46 |
| 2,815,043 | 12/1957 | Kleiner | 182/46 |
| 2,885,132 | 5/1959 | Campbell | 182/46 |

*Primary Examiner*—Reinaldo P. Machado
*Attorney*—Oberlin, Maky, Donnelly & Renner

[57] ABSTRACT

Several embodiments of ladder construction, fabricated by a filament winding process are shown, wherein a continuous glass filament is wound at a controlled helical angle on suitable mandrels and bonded with an epoxy or polyester resin system. Circular, elliptical or rectangular cross-section members can be developed for the rungs and rails and glass fabric or longitudinal fiber members may be combined therewith for additional strength. The rungs and rails are machined and joined with a resin bonding agent and the assembly cured in single section, extension ladder, or section ladder configurations. In the latter, reinforcement of the notched ends is made with plies of resin impregnated glass strips filling the rail cavity in conformity with the notch.

4 Claims, 8 Drawing Figures

PATENTED JUL 4 1972
3,674,110
SHEET 1 OF 2
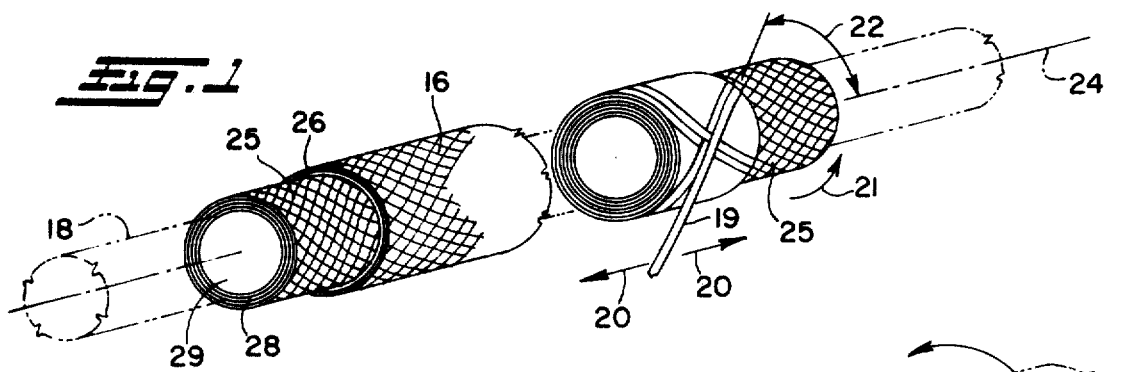
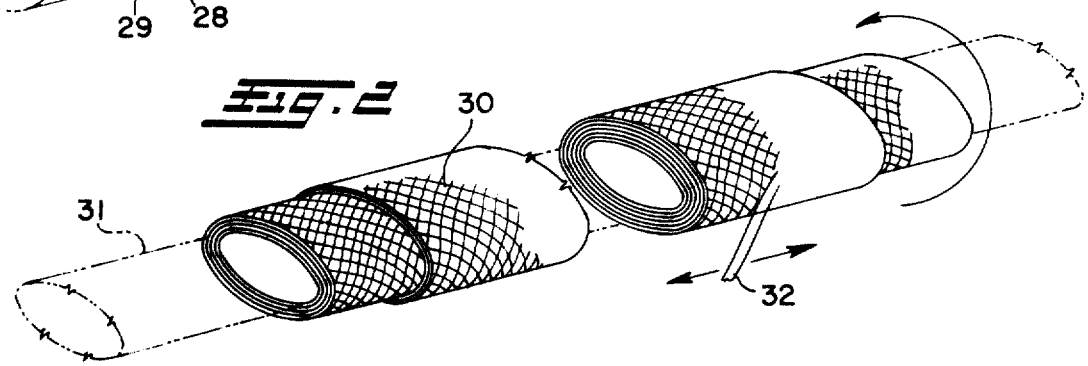
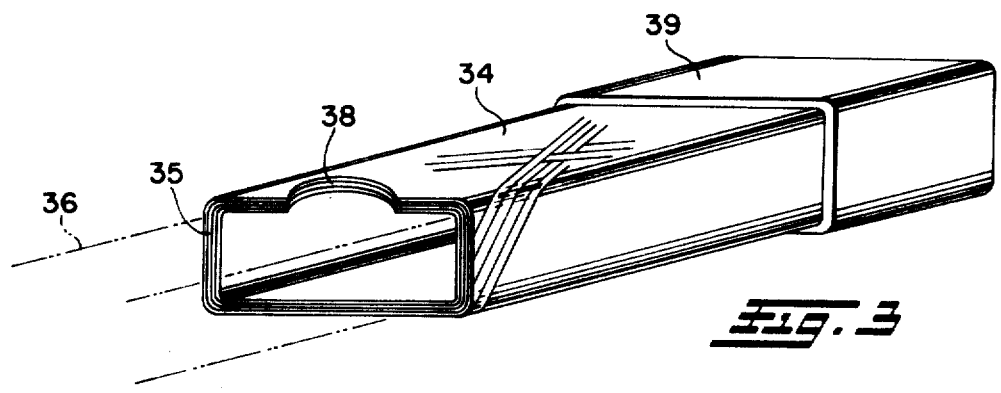
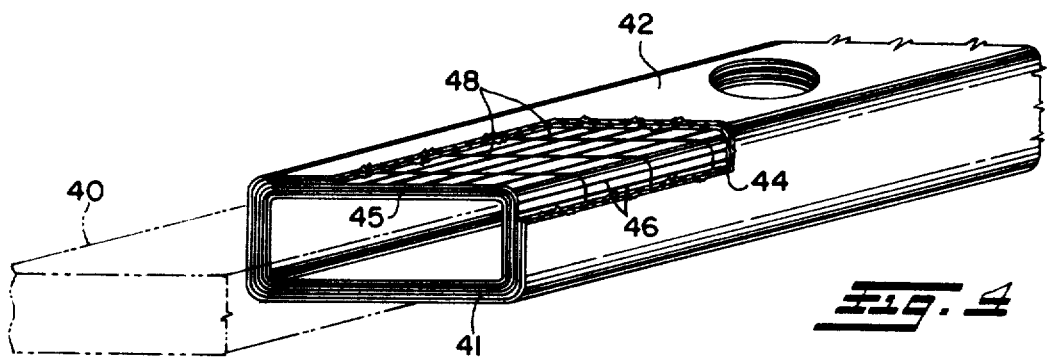
INVENTOR.
ROBERT F. COOKE
BY
Oberlin, Maky, Donnelly & Renner
ATTORNEYS

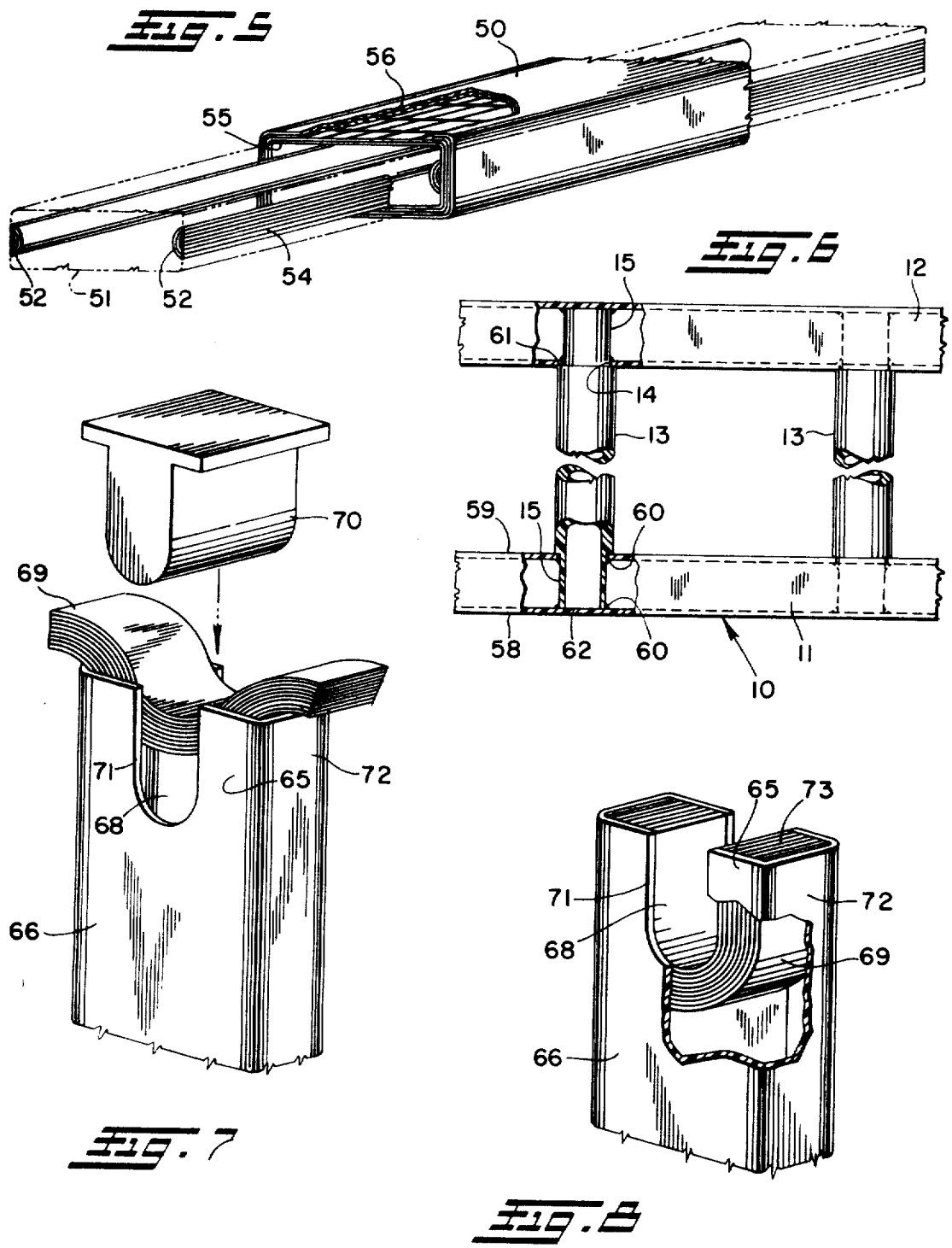

WOUND FILAMENT LADDER

This invention relates to ladders in general and more particularly to ladders formed of windings of continuous strands of fiberglass and the method of producing same.

While many different types of materials have been applied as substitutes for conventional ladders, the fiberglass ladder provides advantages in being extremely lightweight, of good strength, and inert both to the conduction of electricity and the corrosion or decay inherent in other materials.

Strength of structure, however, is of primary concern in this art as a compromise must be made having in mind the overall weight of the end product and the portability and useability of same.

Fiberglass ladders are known in the art, such prior devices however requiring a solid core material for supplying additional strength and rigidity, both for flexural purposes and for support of the rungs. The instant invention requires no such internal support member, relying upon the strength attained in the helical wrapping of a single strand of continuous fiberglass filament in a plurality of layers to provide great per unit area strength and resistance to bending. This technique is so satisfactory that not only the rails, which have been given much consideration in the prior art, but also the rungs may be developed in a similar manner and without additional strengthening, provide adequate support for the ladder assembly.

Therefore, it is one object of this invention to describe a novel method for forming ladder rung and rail sections of either circular, elliptical or rectangular cross-section by the winding of a single strand of fiberglass material.

It is another object of this invention to provide improved ladder apparatus formulated of fiberglass material having superior strength and rigidity and not requiring solid core supports.

It is yet another object of this invention to provide an improved section ladder having a reinforced notched end formed of resin impregnated glass strips filling the cavity of the rail.

It is yet another object of this invention to provide improved ladder apparatus which is lighter, stronger and more rigid than prior plastic ladder configurations and exhibiting rail and rung construction of a more simplified form.

To the accomplishment of the foregoing and related ends, the invention, then, comprises the features hereinafter fully described, the following description and the annexed drawings setting forth in detail certain illustrative embodiments of the invention, these being indicative, however, of but a few of the various ways in which the principles of the invention may be employed.

In the drawings:

FIG. 1 is a broken isometric view of a ladder rung of circular cross-section according to this invention, showing in part the particular winding technique for the continuous fiberglass strand;

FIG. 2 is an isometric view of a modification of the invention showing a ladder rung of elliptical cross-section;

FIG. 3 is an isometric view of a portion of a rectangular cross-section ladder rail formed entirely of filament windings;

FIG. 4 is an isometric view of a portion of a rectangular cross-section ladder rail utilizing a glass fabric wrap underneath the helical fiberglass layers;

FIG. 5 is an isometric view of yet another embodiment of the rectangular cross-sectional rail, utilizing longitudinal fiber reinforcement and showing the forming mandrel;

FIG. 6 is a plan view of the apparatus of the invention partially showing in cross-section the interconnection of the ladder rungs and rails in a conventional single section or extension ladder;

FIG. 7 is an isometric view of the end portion of the section type ladder showing the technique for reinforcing the notched end; and FIG. 8 is an isometric view partly cut away of a completed notched end for a section ladder.

Referring first to FIG. 6, there is shown in plan view the general configuration of a ladder 10 according to this invention, this ladder being of the conventional extension ladder type and having a pair of side rails 11, 12 and a plurality of rungs 13 disposed between and interconnecting the rails at spaced locations therealong. In this type of ladder, the side rails 11, 12 are approximately parallel to one another and the rungs 13 are disposed perpendicular to the rails and when bonded thereto form a rigid structure for use in the conventional manner. When the teachings of this invention are employed in a section ladder configuration, the side rails are inclined toward one another forming a tapered ladder section, the narrow end of which will fit within the wide end of an additional ladder section so that a rigid combined structure may be formed by the interlocking of the end rungs of the ladder with notched end portions of the rails. Such construction is explained in greater detail with reference to FIGS. 7 and 8, but the teachings of this invention are not to be construed as limited to only the named types of ladder arrangements.

In FIG. 6 it is noted that the rails 11, 12 and rungs 13 of the ladder 10 are of hollow construction, being formed by the laying of a continuous filament of fiberglass in an overlapping manner and at a controlled helix angle. The rails 11, 12 and rungs 13 are formed independently, cured to provide a rigid structure and then machined, as by providing apertures 14 in the rails 11, 12 and stepped portions 15 on the rungs 13 for assembly purposes, the type of machining depending upon the configuration of ladder desired. Finally, a resin binding agent is applied to the apertures 14 in the side rails 11, 12 at the time of assembly of the ladder and the complete structure is clamped in a suitable fixture and oven cured. Such typical ladder 10 would be completed by the installation of end caps and standard hardware including pulleys, guides and spacer blocks, these being conventional items, a showing of which is not required for a full understanding of this invention.

Referring now to FIG. 1, there is shown an isometric view, partly broken away, of a rung 16 of circular cross-section. The rungs 13 forming the ladder 10 are preferably of circular or elliptical cross-section, the latter depicted in FIG. 2, either consisting of filament wound fiberglass and an epoxy or polyester resin system.

A mandrel 18 comprising a cylindrical member of extended length comprises the base or forming member upon which the rung 16 is developed and is typically supported in a filament winding machine (not shown) which imparts a rotary movement thereto. The fiberglass is in the form of a single filament 19 of glass fibers and is applied to the mandrel 18 by the winding machine in a reciprocatory motion as depicted by the arrows 20 as the mandrel is rotated. Under the teachings of this invention, the filament 19 is laid upon the mandrel 18 at a controlled helix angle beginning at one end of the mandrel 18 and progressing to the opposite end whereupon the direction of laying of the filament 19 is reversed to construct the second layer of the material, and so on, the filament 19 in each layer randomly crossing over the filaments previously laid to build up a desired thickness for the ring 16.

Such laying pattern is provided by continuous rotation of the mandrel 18 in one direction as indicated by arrow 21, together with a reciprocation of the point of feeding of the continuous filament 19, the relative rates of reciprocation and rotation determining the angle 22 of the helical winding, with respect to the longitudinal centerline 24 of the mandrel 18. It will be apparent that such laying configuration could be as well achieved by a combined rotation of the mandrel 18 together with reciprocation of same relative to a stationary filament feeding point or that plural filaments could be applied simultaneously to the mandrel in techniques well understood in the winding art.

Successive layers of the fiberglass filament 19 are wound upon the mandrel 18 until a suitable thickness is built up, this construction providing considerable strength both in the longitudinal direction for resistance to bending and in the radial direction for resistance to compression of the rung 16. As indicated in FIG. 1, the mandrel 18 is of considerable length and the filament may be wrapped upon the mandrel 18 a distance to provide a great number of rungs in a single winding operation, such rung stock later being machined to individual rung lengths. Prior to machining, however, the mandrel and rung stock are removed to an oven wherein the structure can be cured in a conventional manner, epoxy or polyester resin being applied to the structure for binding of the filaments into a rigid mass during the curing process.

The mandrel 18 may be of steel or aluminum tooling and is designed to form the desired cross-sectional shape of the wound piece whether circular, elliptical or rectangular as described hereinafter. After curing, the rung stock may be subjected to machining or abrading operations to remove surface imperfections and control size for future assembly and subsequently is stripped from the forming mandrel 18 and cut to the desired length. As noted in FIG. 1, both ends of the rung 16 include a stepped-down portion 25 which may be formed by grinding or turning prior to cutting the rungs to the proper length or alternatively the rung stock may be formed in this configuration by control over the length of reciprocation of the filament 19 during the winding operation. In the latter process only the step 26 of the end portion 25 and the end face 28 of the rung itself need be machined to control the length dimension of the rung for later assembly with the rail sections.

The helix angle 22 of the layers of the fiberglass filament 19 is selected to lie in the range of angles of from 0°, which is parallel to the longitudinal centerline 24, to 54 ¾° to the mandrel centerline. It has been determined that the most practical angle for this application is an angle of 20° with respect to the centerline 24. The exact number of layers of fiberglass filament 19 is determined by the length of span and the flexual allowances permissible within the span, however great strength is achieved in this construction with a relatively thin wall section and a cavity 29 at the center of the rung 16, thereby providing a lightweight and portable product.

Referring now to FIG. 2, there is depicted yet another configuration of rung 30 which is practical for ladders constructed under the teachings of this invention. This rung 30 has a generally elliptical cross-section providing a greater effective area at the top of the rung 30 for weight distribution and comfort for the user and greater resistance to turning when assembled in the completed product. The mandrel 31 utilized in this version of the invention is of elliptical cross-section and determines the configuration of the rung stock, the winding process being substantially identical to that described in reference to FIG. 1, wherein a single filament 32 of fiberglass forms the successive layers.

Referring now to FIGS. 3-5 several configurations of rail construction of generally rectangular cross-section are depicted although both the rectangular and elliptical cross-sections have been found to be suitable for rails formed in this single filament winding technique. In FIG. 3 a portion of a straight filament wound rail 34 consisting of a suitable number of layers of fiberglass filament wraps, as set forth previously, is depicted. Again, the number of layers is determined by the strength requirements of the length of span, but still a relatively thin side wall 35 is effected, and a large longitudinal cavity is formed therein. In forming the rail 34, a mandrel 36 of rectangular cross-section is utilized and usually only a single rail 34 is formed in a single winding process, but the same technique of winding is utilized followed by curing and machining of the rail stock if necessary, stripping same from the mandrel 36 for yet additional machining and final assembly. After stripping of the rail 34, holes 38 are drilled in the rail 34 normal to the surface thereof or at an angle if a tapered type section ladder is desired and then bonding agent is applied to the holes 38 prior to final assembly with the rungs and prior to the final oven cure of the complete ladder.

Also shown in FIG. 3 is an end cap 39 formed also of fiberglass material and bonded to the exposed ends of the rail 34 conveniently during the final curing process. The end cap 39 is a rectangular cup of fiberglass material and may be formed in the single filament manner previously described. The cap 39 acts as reinforcement for the end portions of the rail 34 and is a guard against scuffing, splitting and the like. In the section ladder configurations depicted in FIGS. 7 and 8, no end caps are required as the ends of the rails are notched to receive rungs of the mating section ladders and are reinforced internally as described hereinafter.

In the rail embodiment of FIG. 4 again a rectangular mandrel 40 is utilized and the major portion of the wall 41 of the rail 42 is built up of single filament wound fiberglass as previously described, and as seen at 44. However in this embodiment of the invention an initial wrap of fiberglass fabric 45 is applied to the mandrel 40 prior to the winding process. The fabric 45 is a weave of fiberglass filaments having a greater number of strands 46 in the longitudinal direction, parallel to the length of the mandrel 40, than the number of strands 48 in the transverse direction. Several layers of the fabric 45 are applied to the mandrel 40 initially and the combination of the inner fabric 45 with the outer wound filament layer 44 provides a structure having good resistance to longitudinal flexure. As previously described, epoxy or polyester resin systems are combined with the fiberglass fabric 45 and the filament wound layers 44 and the composite assembly is cured to form a unitary structure. Final finishing and machining of this type of ladder rail is substantially the same as that described with reference to the embodiment of FIG. 3.

In FIG. 5, yet another type of rail 50 is shown which can be formed by this winding process. Here a generally rectangular cross-section mandrel 51 is employed, however the mandrel 51 is formed with a pair of slots 52 at opposite sides thereof running the full length of the mandrel 51. The slots 52 are arcuate in shape and are filled with longitudinal strands 54 of fiberglass to complete the generally rectangular configuration of the mandrel 51. Subsequently glass fabric 55 is applied to the mandrel 51 for the initial layers followed by the winding of the single filament fiberglass layers 56 as set forth in detail previously until the desired wall thickness for the rail 50 is attained. Curing of the composite then binds the longitudinal strands 54 with the glass fabric 55 and the outer wound layers 56 to provide a cohesive structure having additional reinforcement over that construction depicted in FIG. 4. This type of construction would be utilized where greater rigidity of the rail 50 is required especially with regard to longitudinal flexure.

The assembly of the rails 11, 12 and rungs 13 for an extension type ladder 10 is shown in FIG. 6 with portions of the assembly cut away to show the mating configuration. Normally a fixture is utilized in the assembly process whereby the spacing of the holes 14 drilled in the side rails 11, 12 may be accurately controlled and the complete assembly clamped for final curing. As previously mentioned, a resin bonding agent is applied to the drilled holes 14 prior to the insertion of the stepped portion 15 of the rungs 13 so that upon assembly some of the bonding agent is carried within the rails 11, 12 for joining of both ends of the stepped portion 15 with both walls 58, 59 of the rails. Due to the fluid nature of the bonding agent small fillets 60 of same will be formed at the junctions of the rails 11, 12 and rungs 13 to assure a rigid and sealed structure.

The dimension of the stepped portion 15 of the rung 13 is controlled accurately so that the step 61 abuts the outer surface of the rail wall 59 while the end face 62 of the rung 13 abuts the interior surface of the rail wall 58. Similarly the overall length dimension of the rung 13 is accurately controlled so as to achieve a proper spacing of the rails 11, 12 and a high degree of parallelism. The step 61 of the rung 13 is exposed also to the bonding agent and upon final curing of the completed product provides not only rigidity for the ladder 10 but also a sealed construction whereby the entrance of moisture and contaminants are prevented through the drilled holes 14.

The section type of ladder depicted in FIGS. 7 and 8 may be of any of the wound filament types of constructions described with reference to FIGS. 3-5 but the ends 65 of each rail 66 are characterized in having a transverse notch 68 therein which is adapted to receive the rung of an adjacent section ladder. In this form of ladder no end caps are used for protection or strengthening of the ends of the rail 66, however a plurality of resin impregnated strips 69 of fiberglass fabric are employed to complete the construction of the rail ends 65. The impregnated strips 69 may be laid across the open end 65 of the rail and are of suitable length so that when a forming plug 70 is inserted into the notch 68, the strips 69 are caused to conform to the configuration of the notch and substantially fill the remainder of the rail end 65. A sufficient number of strips are utilized to provide a thickness for substantially filling the space between the edge 71 of the notch 68 and the side wall 72 of the rectangular rail 66, the strips 69 being bonded to such end walls 65 during the curing process to form a solid end section for the rail. The plug 70 is, of course, withdrawn prior to curing and the end surface 73 of the rail may be machined to a smooth surface.

I therefore particularly point out and distinctly claim as my invention:

1. A fiberglass ladder, comprising a pair of rails, a plurality of rungs disposed between and interconnecting said rails at spaced locations, said rungs and said rails being formed of windings of single filament fiberglass material and having hollow cross-sections, means for bonding said rungs to said rails to provide a rigid structure, said rails being inclined slightly with respect to said rungs for interlocking with a further section ladder of the same configuration, each said rail having a notch at one end for engaging the rung of said further section ladder, and further comprising a plurality of resin impregnated glass strips filling said one end of said rail and conforming to the shape of said notch, said strips being bonded to said rails by curing of the resin.

2. A fiberglass ladder comprising a pair of hollow rails, a plurality of hollow rungs disposed between and interconnecting said rails at spaced locations, said rungs and said rails being formed of plural overlapped windings of single filament fiberglass material, said rails further including a layer of fiberglass fabric bonded within and adjacent the filament windings thereof, with said fabric comprising woven fiberglass strands having a greater number of strands in the longitudinal direction than in the transverse direction, said rails being apertured for receipt of said rungs, with the latter bridging the void within said rails, and means for bonding said rungs to said rails to reinforce said rails and provide therewith a rigid structure.

3. A ladder as set forth in claim 2 wherein said rails are of rectangular cross-section each further including a pair of ribs bonded on interior opposing sides of said fiberglass fabric and extending substantially the full length of said rails for reinforcing same.

4. A ladder as set forth in claim 3 wherein each of said ribs comprise a bundle of fibers extending longitudinally of said rails, said ribs having a segmented arcuate cross-section.

* * * * *